United States Patent
Itagaki et al.

(10) Patent No.: US 7,768,031 B2
(45) Date of Patent: Aug. 3, 2010

(54) LIGHT EMITTING DEVICE AND METHOD OF PRODUCING A LIGHT EMITTING DEVICE

(75) Inventors: Naho Itagaki, Yokohama (JP); Tomoyuki Oike, Yokohama (JP); Tatsuya Iwasaki, Tokyo (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 11/677,251

(22) Filed: Feb. 21, 2007

(65) Prior Publication Data

US 2007/0216287 A1 Sep. 20, 2007

(30) Foreign Application Priority Data

Mar. 20, 2006 (JP) .............................. 2006-076840

(51) Int. Cl.
*H01L 33/26* (2010.01)
*H05B 33/14* (2006.01)

(52) U.S. Cl. ............................ 257/101; 257/42; 257/43; 257/94; 257/102; 257/103; 257/191; 257/E33.04; 313/502; 313/503; 252/301.6 S

(58) Field of Classification Search ......... 257/101–103, 257/42, 43, 94, 191, E33.04; 313/502, 503, 313/506, 507; 252/301.4 S, 301.4 F, 301.6 S, 252/301.6 F See application file for complete search history.

(56) References Cited

U.S. PATENT DOCUMENTS 5,008,891 A * 4/1991 Morita .................... 372/45.01

2005/0214573 A1 9/2005 Den et al. ................... 428/690

FOREIGN PATENT DOCUMENTS

| JP | 08130347 A | * | 5/1996 |
| JP | 2001-348296 | | 12/2001 |

OTHER PUBLICATIONS

Matsumoto et al. JP08130347 (Abstract Translation).*
Chichibu, S.F., et al., "Fabrication of p-CuGaS$_2$/n-ZnO:Al heterojunction light-emitting diode grown by metalorganic vapor phase epitaxy and helicon-wave-excited-plasma sputtering methods", Journal of Physics and Chemistry of Solids, 66, pp. 1868-1871, 2005.
Choi, D.H., et al., "Drastic Enlargement of Grain Size of Excimer-Laser-Crystallized Polysilicon Films", Jpn. J. Appl. Phys., 31, pp. 4545-4549, 1992.

* cited by examiner

*Primary Examiner*—Jerome Jackson, Jr.
*Assistant Examiner*—Yu Chen
(74) *Attorney, Agent, or Firm*—Fitzpatrick, Cella, Harper & Scinto

(57) ABSTRACT

To provide a DC drive type inorganic light emitting device excellent in luminous efficiency, provided is a light emitting device, including: a substrate; and a first layer and a second layer laminated on the substrate, in which the second layer is formed of a first portion containing Zn and at least one element chosen from S and Se as its constituent elements; and a second portion containing at least one element chosen from Cu and Ag and at least one element chosen from S and Se as its constituent elements; the first layer is made of a light emitting layer formed of at least one element chosen from S and Se and of Zn; and, in the second layer, the second portion has a cross section parallel to the substrate which tapers toward the first layer.

7 Claims, 4 Drawing Sheets

⇩ LIGHT

⇧ LIGHT

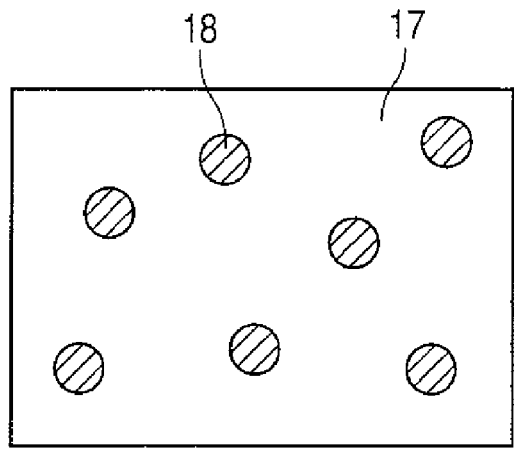
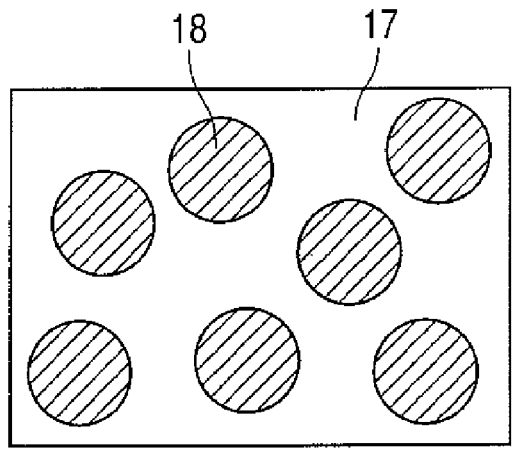
FIG. 3A  FIG. 3B
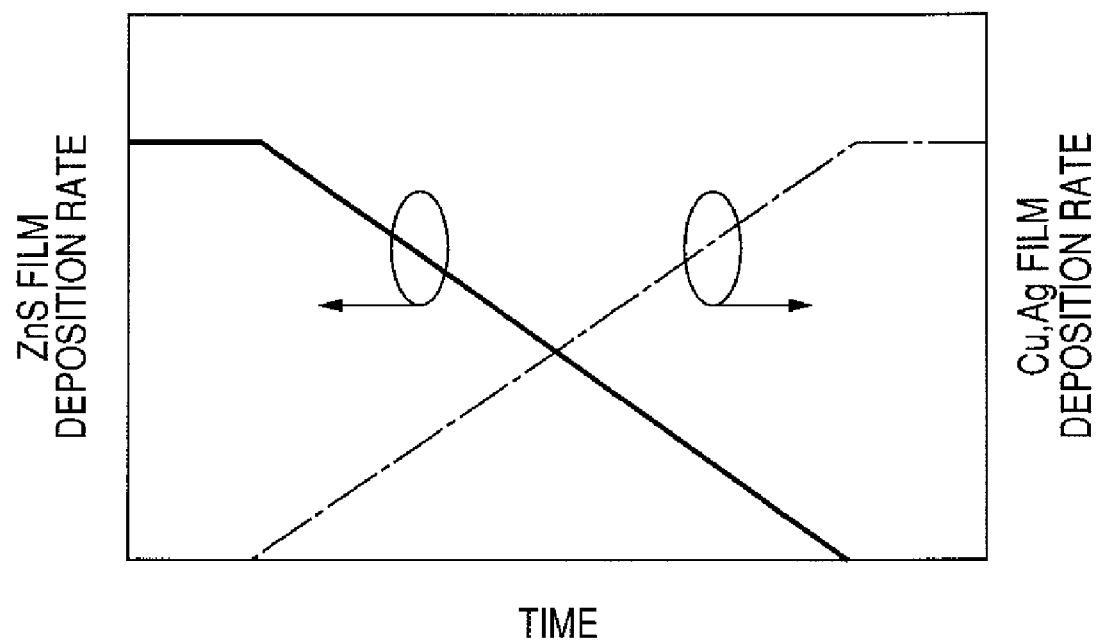
FIG. 4

LIGHT

US 7,768,031 B2

LIGHT EMITTING DEVICE AND METHOD OF PRODUCING A LIGHT EMITTING DEVICE

BACKGROUND OF THE INVENTION

1. Field of the Invention

The present invention relates to a DC drive type light emitting device and a method of producing the light emitting device, in particular, a light emitting device which can be driven at a low voltage and has high luminous efficiency and a method of producing the light emitting device.

2. Description of the Related Art

An electroluminescence (hereinafter, also referred to as "EL") device is a conventionally known example of a thin light emitting device for use in, for example, the backlight of the display of a mobile phone.

EL devices are classified into dispersion type EL devices and thin-film type EL devices depending on a difference in the basic structure of EL devices to be caused to emit light. A dispersion type EL device using a zinc sulfide powder as a phosphor is most generally used.

The dispersion type EL device emits light on the basis of the following principle: the particles of the phosphor for the dispersion type EL device are dispersed in a dielectric substance, and an AC voltage and a DC voltage are applied between electrodes which are placed on both sides of the dispersed phosphor and at least one of which is transparent so that light is emitted.

The dispersion type EL device is characterized in that the device can be formed on a flexible film (such as PET or TAC) substrate by a simple method such as screen printing or any one of various coating methods.

Accordingly, the dispersion type EL is a light emitting device which is of low cost and is suitable for large area displays, and has been used in, for example, an advertising display. However, when considering that it is a surface light emitting device, the device is problematic because of its low brightness and short lifetime as compared to those of a thin-film type EL device.

At present, an AC operated double insulation structure device has been mainly put into practical use in the field of the thin-film type EL devices. A thin-film type EL device is characterized in that an EL light emitting layer using zinc sulfide as its base material is covered with two insulating layers. This structure allows a high electric field to be stably applied to the light emitting layer.

However, as is apparent from the structure of the double insulation structure device, the device is operated only by an alternating current.

On the other hand, a thin-film type EL device that emits light upon application of a direct current requires a driving power supply simpler than that of an AC operation type device with a load close to a purely capacitive load, so the thin-film type EL device is expected to be efficiently driven.

However, nearly all attempts that have been made heretofore are put in the category of a collision excitation type in terms of the excitation mechanism of a phosphor.

This type essentially requires a high electric field region of $10^5$ to $10^6$ V/cm in a light emitting layer, so dielectric breakdown makes it difficult to maintain a high electric field stably.

In addition, owing to this high DC electric field, an ionized impurity in the light emitting layer moves in the direction of the electric field, though the movement is slow. The movement changes the electric field distribution, and shifts the operating characteristics. The change and the shift are also responsible for the instability of the electric field.

In view of the above, a carrier injection/recombination type thin-film light emitting device capable of operating at a low DC voltage of about 10 V has been recently developed, and it has been reported that several devices were successfully developed.

For example, a carrier injection/recombination type device using an Al—ZnS—$CuGaS_2$ diode structure (Japanese journal of applied physics, vol. 31, p. L1606 (1992)) and a carrier injection/recombination type device using a p-type $CuGaS_2$/n-type ZnO:Al heterojunction diode structure (Journal of physics and chemistry of solid, vol. 66, p. 1868 (2005)) have been reported.

However, a device using any one of the structures described in those documents has extremely low luminous efficiency. For example, in the technique disclosed in Japanese journal of applied physics, vol. 31, p. L1606 (1992), light is barely emitted by applying a voltage of 19 V at a temperature of 90 K.

This is probably due to the poor lattice matching of the pn junction and the low carrier injection efficiency of the carriers injected into a light emitting layer.

A method involving providing the inside of a light emitting device with plural points to each of which an electric field concentrates has been conventionally known as a method of improving the carrier injection efficiency. A device to which the method is applicable is not limited to an inorganic EL device. For example, in Japanese Patent Application Laid-Open No. 2001-348296, a needle-like diamond film is used as a material for a hole transporting layer of an organic EL device.

In this case, when a voltage is applied between a hole injecting electrode and an electron injecting electrode, a needle-like structure is formed on the surface of the diamond film, so the hole injection efficiency of the holes injected from the needle-like structure becomes high. As a result, an organic light emitting device having extremely high emission intensity can be obtained.

Examples of a method of providing the inside of a light emitting device with a fine structure serving as an electric field concentration point include the following.

The examples include a method based on a plasma treatment described in Japanese Patent Application Laid-Open No. 2001-348296, a method of forming a fine structure involving the employment of, for example, lithography, and a method of forming a fine structured material involving the utilization of a structure formed in a self-organized manner.

However, in a material for use in a known DC drive type inorganic EL device, it is difficult to uniformly form such fine structure as described above in a film surface with good reproducibility. Accordingly, stable light emitting property cannot be obtained.

In particular, a method involving the employment of, for example, a plasma treatment or lithography cannot provide good interfacial property, with the result that the carrier injection efficiency of the carriers injected reduces.

In view of the above, an object of the present invention is to provide a DC drive type inorganic light emitting device excellent in luminous efficiency. Another object of the present invention is to provide a method of producing the light emitting device.

To solve the above-mentioned problem, according to the present invention, there is provided a light emitting device, including: a substrate; and a first layer and a second layer laminated on the substrate, in which: the second layer is formed of: a first portion containing Zn and at least one element chosen from S and Se as its constituent elements; and a second portion containing at least one element chosen from Cu and Ag and at least one element chosen from S and Se as its constituent elements; the first layer is a light emitting layer formed of at least one element chosen from S and Se and of Zn; and in the second layer, the second portion has a cross section parallel to the substrate which tapers toward the first layer.

Further, according to the present invention, there is provided a method of producing a light emitting device in which a first layer and a second layer are provided to be adjacent to each other on a substrate, the method including: forming the first layer containing Zn and at least one element chosen from S and Se; and forming the second layer containing at least one element chosen from S and Se, at least one element chosen from Cu and Ag, and Zn, in which at least one of a feeding amount of the at least one element chosen from Cu and Ag and a feeding amount of Zn is changed with time.

Further, according to the present invention, there is provided a method of producing a light emitting device in which a first layer and a second layer are provided to be adjacent to each other on a substrate, the method including: forming the first layer containing Zn and at least one element chosen from S and Se; and forming the second layer containing at least one element chosen from S and Se, at least one element chosen from Cu and Ag, and Zn, in which: at least one of a feeding amount of the at least one element chosen from Cu and Ag and a feeding amount of Zn is changed with time; and the second layer is distributed being separated into a first portion containing Zn and at least one element chosen from S and Se as its constituent elements, and a second portion containing the at least one element chosen from Cu and Ag and the at least one element chosen from S and Se as its constituent elements, and is formed so that the second portion has a cross section parallel to the substrate which tapers toward the first layer.

According to the present invention, the presence of the portion that tapers toward the light emitting layer enables the stable formation of a structure excellent in interfacial property in the inside of the light emitting device.

As a result, an interface having such a shape that an electric field locally concentrates can be stably formed with good controllability. Accordingly, charge can be effectively injected into the light emitting layer, and light can be emitted at a low voltage.

Further features of the present invention will become apparent from the following description of exemplary embodiments with reference to the attached drawings.

BRIEF DESCRIPTION OF THE DRAWINGS

FIGS. 3A and 3B are schematic sectional views taken along the broken lines of FIG. 1, respectively.

FIG. 4 is a graph showing the film deposition rate of a constituent element of the light emitting device as the embodiment of the present invention.

DESCRIPTION OF THE PREFERRED EMBODIMENTS

Hereinafter, an exemplary embodiment for carrying out the present invention will be described with reference to the accompanying drawings.

Figure 1:
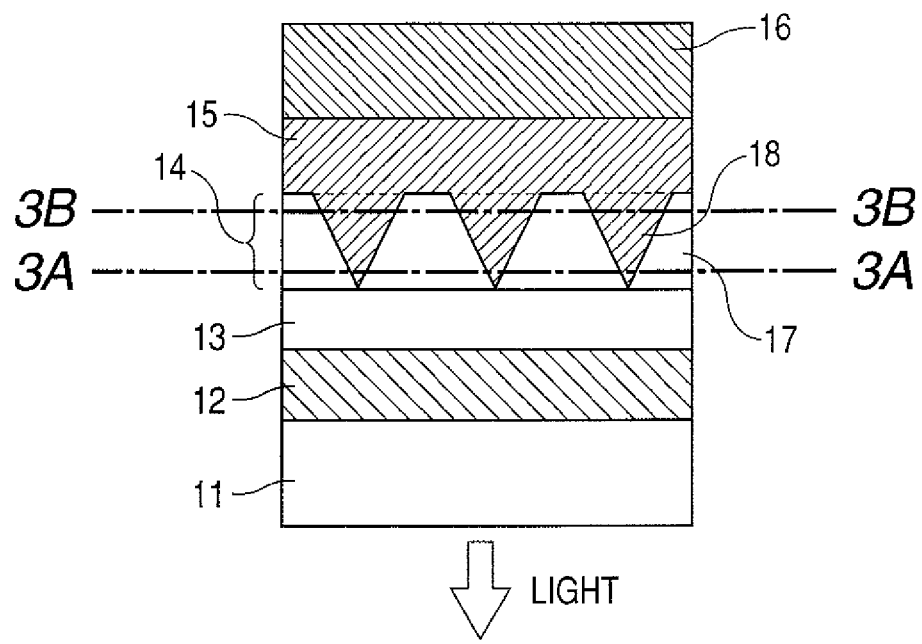
FIG. 1 is a sectional view schematically showing an example of the structure of a light emitting device as an embodiment of the present invention.
Figure 2:
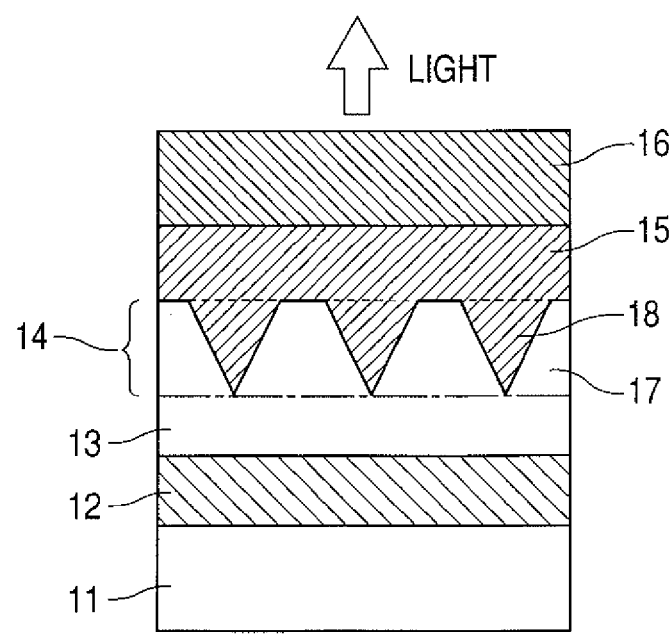
FIG. 2 is a sectional view schematically showing an example of the structure of the light emitting device as the embodiment of the present invention.

FIGS. 1 and 2 are each a sectional view schematically showing an example of the structure of a light emitting device as an embodiment of the present invention. The light emitting device is formed by providing a cathode 12 on a substrate 11 and by providing a light emitting layer 13 as a first layer, a fine structure layer 14 as a second layer, and an anode 16 in the stated order on the cathode 12.

The fine structure layer 14 is formed of: a matrix portion 17; and portions 18 each formed of a p-type semiconductor. It should be noted that a p-type semiconductor layer 15 may be provided between the fine structure layer 14 and the anode 16. In this embodiment, the p-type semiconductor layer 15 is provided.

In addition, the light emitting device may be formed so as to have a layer constitution in inverse relation to that of this embodiment. That is, the light emitting device may be formed by providing the anode 16, the fine structure layer 14, the light emitting layer 13, and the cathode 12 in the stated order on the substrate 11.

The constituent elements of each of the light emitting layer 13 and the matrix portion 17 are an element chosen from S and Se, and Zn, and the constituent elements of each of the portions 18 are an element chosen from Cu and Ag and an element chosen from S and Se. It is known that a light emitting device having high luminous efficiency and high stability can be obtained with good reproducibility in this case.

The reason why such light emitting device can be obtained is unclear, but one possible reason is that, in the above-mentioned material combination, a fine structure can be formed in a self-organized manner, and the interfacial property of the junction is excellent.

In particular, the interface between the light emitting layer 13 and the fine structure layer 14 in which the portions 18 each have a pointed shape is stably formed. Accordingly, it is conceivable that charge can be effectively injected by utilizing local electric field concentration, and light can be emitted at a low voltage.

In addition, the fine structure can be uniformly produced with good reproducibility probably because the fine structure can be controlled depending on film formation conditions.

The light emitting layer 13 uses a phosphor having an element chosen from S and Se, and Zn as its base material.

At least one element chosen from Cu and Ag, and at least one element selected from Al, Ga, In, and Cl are preferably added as materials of the light emitting layer 13.

It should be noted that each of the above-mentioned elements to be added may be added uniformly over a film surface, or may be added locally to the surface.

FIG. 3A is a schematic sectional view taken along the broken line 3A-3A of FIG. 1, and FIG. 3B is a schematic sectional view taken along the broken line 3B-3B of FIG. 1.

The matrix portion 17, which is formed of an element chosen from S and Se, and Zn, may contain an element to be added to the light emitting layer 13, and has the same crystalline structure as that of the light emitting layer 13.

Each of the portions 18 is formed of a p-type semiconductor formed of an element chosen from Cu and Ag and an element chosen from S and Se, and may contain an element selected from Al, Ga, and In.

As shown in FIG. 3, the cross section parallel to the substrate of each of the portions 18 tapers toward the light emitting layer 13.

In addition, the element chosen from Cu and Ag and the element chosen from S and Se have a chalcopyrite type crystalline structure, and the element chosen from S and Se and Zn have a sphalerite type crystalline structure. The term "chalcopyrite type crystalline structure" as used herein refers to a structure having a unit cell obtained by stacking two unit cells of a sphalerite type structure of a cubic crystal in a c-axis direction, the structure having a tetragonal structure. A chalcopyrite compound in the present invention has a lattice constant of 0.531 to 0.609 nm while ZnS of a sphalerite type has a lattice constant of 0.541 nm and ZnSe of a sphalerite type has a lattice constant of 0.567 nm. Accordingly, when a chalcopyrite compound is used in each of the portions 18 and a sphalerite compound is used in the light emitting layer 13 as described above, the layer and each of the portions show excellent lattice matching, whereby a light emitting device having high brightness and showing stable light emitting property can be obtained.

A substrate material and an electrode material are not particularly limited in this embodiment, but a material for the substrate 11 is preferably chosen from sapphire and quartz, a material for the cathode 12 is preferably selected from ZnO: Al, Al, Mg, Ag, and Ca, and a material for the anode 16 is preferably selected from Pt, NiO:Li, $Cu_2O$, Ni, Au, and ITO.

It is also preferable to use Mo as an adhesion layer between the p-type semiconductor layer 15 and the anode 16.

The use of Pt having the largest work function for the anode 16 reduces the size of a barrier against a hole, whereby the hole injection efficiency of the holes injected into the portions 18 is improved, and hence a device having higher luminous efficiency can be obtained.

In addition, the use of ITO in the anode 16 allows light to be extracted from the anode side as well because ITO is transparent to visible light.

In this case, light generated in the light emitting layer 13 passes the fine structure layer 14 as shown in FIG. 2. Accordingly, the following effect can be obtained: the ratio of total reflection of light at the interface reduces, and light extraction efficiency improves.

Production Method

Hereinafter, a method of producing a light emitting device of this embodiment will be described.

First, the substrate 11 made of, for example, sapphire or quartz is prepared, and the cathode 12 is formed by, for example, any one of the vapor phase methods such as a sputtering method, a pulse laser deposition method, an atomic layer deposition method, and an electron beam deposition method, or a combination of two or more of them.

A layer formed of an element chosen from S and Se, and Zn is similarly formed on the resultant by employing a vapor phase method or the like. At this time, several percent of $H_2S$ or $H_2Se$ may be introduced into a vapor phase. In addition, at the same time, at least one element selected from Al, Ga, In, Cu, Ag, and Cl can be fed as an additional element and incorporated into the light emitting layer 13.

Subsequently, a film containing an element chosen from Cu and Ag, an element chosen from S and Se, and Zn is formed.

At this time, the following adjustment is performed: the feeding amount of the element chosen from Cu and Ag and the feeding amount of Zn are changed with time, for example, as shown in FIG. 4 so that the Zn concentration ratio increases toward the cathode 12.

In the case of, for example, film formation using a sputtering method, the adjustment is performed by gradually changing power to be applied to each of a target containing Zn and a target containing Cu or Ag.

At this time, the substrate temperature is desirably about 300° C. In addition, a heat treatment may be performed in an atmosphere containing several percent of $H_2S$ or $H_2Se$ after the film formation in order that a stable sulfide or selenide is obtained. The heat treatment temperature is desirably about 600° C., though the desirable temperature varies depending on a substrate material or an electrode material.

Through the foregoing steps, the light emitting layer 13, the fine structure layer 14, and the p-type semiconductor layer 15 are formed.

It should be noted that the p-type semiconductor layer 15 is not necessarily needed to be formed, and can be omitted by controlling the condition for the film formation.

The light emitting layer 13 is formed of an element chosen from S and Se, and Zn.

The fine structure layer 14 is formed of a dispersed distribution of the portions 18 each formed of an element chosen from Cu and Ag and of an element chosen from S and Se, and the portion 17 formed of an element chosen from S and Se, and Zn.

Each of the portions 18 has such a structure that its cross section parallel to the substrate tapers toward the light emitting layer 13.

At this time, the shape of each of the portions 18 becomes a conical shape or a cylindrical shape depending on the manner of adjusting the Zn concentration in the fine structure layer 14.

The mechanism via which the fine structure layer 14 is formed is unclear, but the mechanism can be considered to be as described below.

Since the Zn concentration is large in a region close to the light emitting layer 13, the crystal growth of the element chosen from S and Se, and Zn thereon is promoted, whereby a crystal having a large particle size is formed. On the other hand, however, the concentration of Cu or Ag is low, so the crystal growth of the element chosen from Cu and Ag and the element chosen from S and Se does not progress smoothly.

As a result, in the region close to the light emitting layer 13, such a structure that the element chosen from Cu and Ag and the element chosen from S and Se are precipitated in the crystal grain boundary of the element chosen from S and Se, and Zn is formed. In addition, the Zn concentration in the film reduces toward the surface of the film, so the crystal grain size of the element chosen from S and Se, and Zn reduces toward the surface of the film.

As a result, the fine structure layer 14 having such structure as described above is probably formed.

Next, the anode 16 is formed by a vapor phase method or the like.

An impurity may be added to the light emitting layer 13 by feeding an element to serve as the impurity simultaneously with the formation of the light emitting layer 13 as described above. Alternatively, material diffusion from the fine structure layer 14 and the cathode material may be employed. The material diffusion may be performed simultaneously with the formation of the fine structure layer or with a heat treatment after the formation.

Alternatively, it can be produced by a method involving: forming the anode 16 by a vapor phase method on the substrate 11; forming the fine structure layer 14 and the light emitting layer 13 on the anode 16; and forming the cathode 12.

EXAMPLES

Hereinafter, the present invention will be described in more detail by way of specific examples.

Example 1

An embodiment of a light emitting material in the present invention will be described with reference to FIG. 1.

A sapphire substrate is used as the substrate 11. ZnO:Al is formed into a film having a thickness of 150 nm to serve as the cathode 12 on the substrate 11 by a magnetron sputtering method using ZnO and Al as targets.

At this time, a substrate temperature was set to 300° C., and a mixed gas of Ar and $O_2$ is flowed so as to have a pressure of about 0.5 Pa. After that, the light emitting layer 13 and the fine structure layer 14 are formed as described below.

A magnetron sputtering device provided with three cathodes is used for film formation. After a ZnS layer having a thickness of about 500 nm is formed by using a ZnS target, a layer formed of $CuAlS_2$ and ZnS and having a thickness of 700 nm is formed by using ZnS, Cu, and Al as targets.

At this time, the substrate temperature is set to 300° C., and a mixed gas of Ar and $H_2S$ is flowed so as to have a pressure of about 0.5 Pa.

Figure 5:
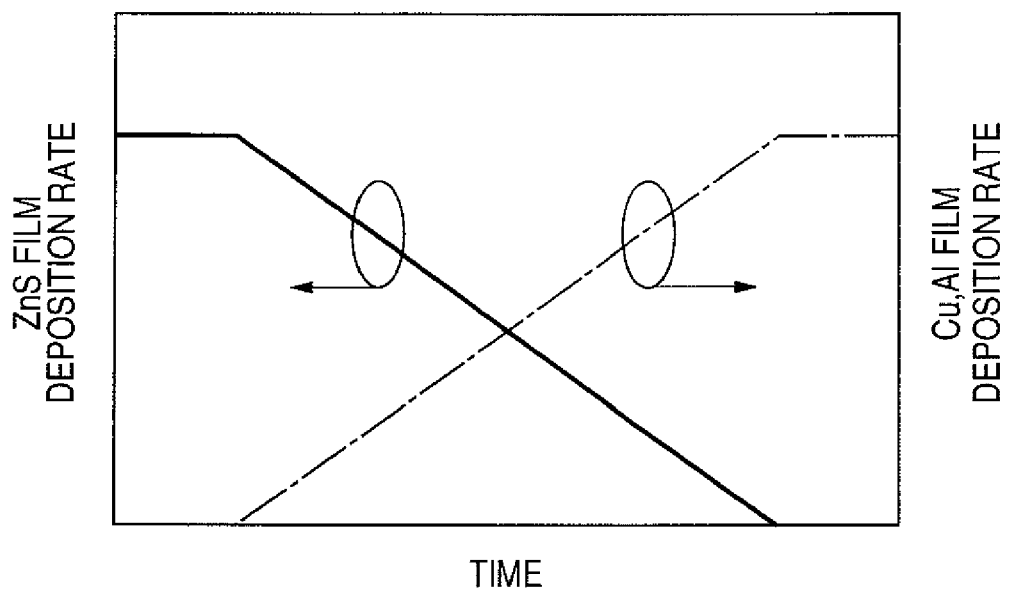
FIG. 5 is a graph showing the film deposition rate of a constituent element of the light emitting device as the embodiment of the present invention.

In addition, at this time, the following adjustment is performed: the film deposition rate of Cu and Al, and the film deposition rate of ZnS are changed as shown in FIG. 5 by controlling the power applied to each of the ZnS, Cu, and Al targets so that the Zn concentration ratio would increase toward the cathode 12.

Next, the substrate on which the layers are formed is subjected to a heat treatment by using an electric furnace under an Ar atmosphere containing 3% of $H_2S$ at about 600° C.

The resultant layers are evaluated by X-ray diffraction. As a result, a peak resulting from the sphalerite structure of ZnS and a peak resulting from the chalcopyrite structure of $CuAlS_2$ are observed.

In addition, the light emitting layer 13, the fine structure layer 14 formed by a dispersed distribution of the portion 17 and the portions 18, and the p-type semiconductor layer 15 are observed with an electron microscope.

In addition, the cross section parallel to the substrate of the portions 18 has an area of about several square nanometers to several tens of square nanometers near the light emitting layer 13, and has an area of about several square micrometers to several tens of square micrometers near the p-type semiconductor layer 15.

Next, Mo is formed into a film having a thickness of 10 nm and Pt is formed into a film having a thickness of 50 nm on the p-type semiconductor layer 15 by a magnetron sputtering method to provide the anode 16.

The device thus produced was evaluated for current-voltage characteristics by flowing a current in the device. As a result, the device was observed emitting rather bluish green light.

This is probably because material diffusion from the fine structure layer 14 and the cathode 12 takes place owing to the above-mentioned heat treatment, whereby a portion formed of ZnS:Cu,Al is formed in the light emitting layer 13.

In addition, in this example, the crystalline structures of $CuAlS_2$ and ZnS are similar to each other, and lattice matching between $CuAlS_2$ and ZnS is good.

Further, the interface between the light emitting layer 13 and the fine structure layer 14 in which the portions 18 each have a pointed shape is formed. Accordingly, it is conceivable that charge can be effectively injected by utilizing local electric field concentration. That is, it is conceivable that a light emitting device having high brightness can be obtained owing to such structure.

In addition, the occurrence of the local concentration of an electric field is conventionally apt to cause a device failure. In the present invention, however, a device failure hardly occurs probably because the crystallinity of the light emitting layer 13 and the crystallinity of each of the portions 18 are good, and lattice matching between them.

In addition, a device produced by the same production method as that described above except that each of the portions 18 was formed of $Cu(InGa)S_2$ was evaluated for current-voltage characteristics. As a result, the device was observed emitting green light. At this time, a portion formed of ZnS:In,Ga,Al is probably formed in the light emitting layer 13.

In addition, a device produced by the same production method as that described above except that each of the portions 18 was formed of $AgAlS_2$ was evaluated for current-voltage characteristics. As a result, the device was observed emitting blue light. At this time, a portion formed of ZnS:Ag,Al was probably formed in the light emitting layer 13.

Example 2

An embodiment of the light emitting material in the present invention will be described with reference to FIG. 1.

A sapphire substrate is used as the substrate 11. ZnO:Al is formed into a film having a thickness of 150 nm to serve as the cathode 12 on the substrate 11 by a magnetron sputtering method using ZnO and Al as targets.

At this time, the substrate temperature is set to 300° C., and a mixed gas of Ar and $O_2$ is flowed so as to have a pressure of about 0.5 Pa. After that, the light emitting layer 13 and the fine structure layer 14 are formed as described below.

A magnetron sputtering device provided with three cathodes is used for film formation. After a ZnS layer having a thickness of about 500 nm is formed by using a ZnS target, a layer formed of $CuAlS_2$ and ZnS and having a thickness of 700 nm is formed by using ZnS, Cu, and Al as targets.

At this time, the substrate temperature is set to 300° C., and a mixed gas of Ar and $H_2S$ is flowed so as to have a pressure of about 0.5 Pa.

In addition, at this time, the following adjustment is performed: the film deposition rate of Cu and Al, and the film deposition rate of ZnS are changed as shown in FIG. 5 by controlling the power applied to each of the ZnS, Cu, and Al targets so that the Zn concentration the ratio would increase toward the cathode 12.

Next, the substrate on which the layers are formed is subjected to a heat treatment by using an electric furnace under an Ar atmosphere containing 3% of $H_2Se$ at about 600° C.

The light emitting layer 13, the fine structure layer 14 formed by the dispersed distribution of the portion 17 and the portions 18, and the p-type semiconductor layer 15 are observed with an electron microscope.

In addition, the cross section parallel to the substrate of the portions 18 has an area of about several square nanometers to several tens of square nanometers near the light emitting layer 13, and has an area of about several square micrometers to several tens of square micrometers near the p-type semiconductor layer 15.

Next, Mo is formed into a film having a thickness of 10 nm and Pt is formed into a film having a thickness of 50 nm on the p-type semiconductor layer 15 by a magnetron sputtering to provide the anode 16.

The device thus produced was evaluated for current-voltage characteristics by flowing a current in the device. As a result, the device was observed emitting green light.

This is probably because material diffusion from the fine structure layer 14 and the cathode 12 takes place owing to the above-mentioned heat treatment, whereby a portion formed of $Zn(S_{0.9}Se_{0.1}):Cu,Al$ is formed in the light emitting layer 13.

In addition, in this example, the crystalline structures of $CuAlS_2$ and ZnS are similar to each other, and lattice matching between $CuAlS_2$ and ZnS is good.

Further, the interface between the light emitting layer 13 and the fine structure layer 14 in which the portions 18 each have a pointed shape is formed. Accordingly, it is conceivable that charge can be effectively injected by utilizing local electric field concentration. That is, it is conceivable that a light emitting device having high brightness can be obtained owing to such structure.

The occurrence of the local concentration of an electric field is conventionally apt to cause a device failure. In the present invention, however, a device failure hardly occurs probably because the crystallinity of the light emitting layer 13 and the crystallinity of each of the portions 18 are good, and lattice matching between them.

Example 3

Figure 6:
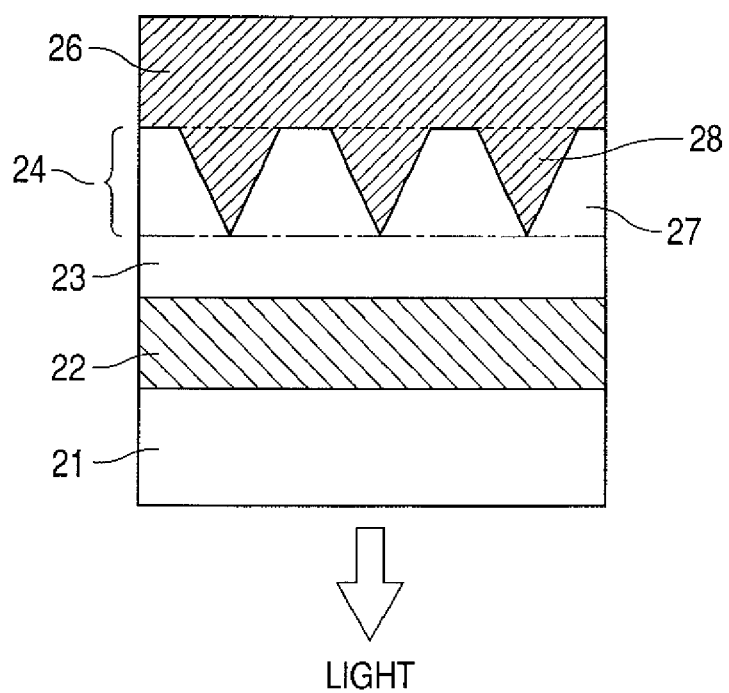
FIG. 6 is a schematic sectional view showing the constitution of the light emitting device as the embodiment of the present invention.

An embodiment of the light emitting material in the present invention will be described with reference to FIG. 6.

A sapphire substrate is used as a substrate 21. ZnO:Al is formed into a film having a thickness of 150 nm to serve as a cathode 22 on the substrate 21 by a pulse laser deposition method using ZnO and Al as targets.

At this time, the substrate temperature is set to 300° C., and $O_2$ is flowed so as to have a pressure of about 0.01 Pa.

After that, a light emitting layer 23 and a fine structure layer 24 are formed as described below.

After a ZnS layer having a thickness of about 500 nm formed by using a ZnS target, a layer formed of $Cu_2S$ and ZnS and having a thickness of 700 nm is formed by using ZnS and Cu as targets.

Figure 7:
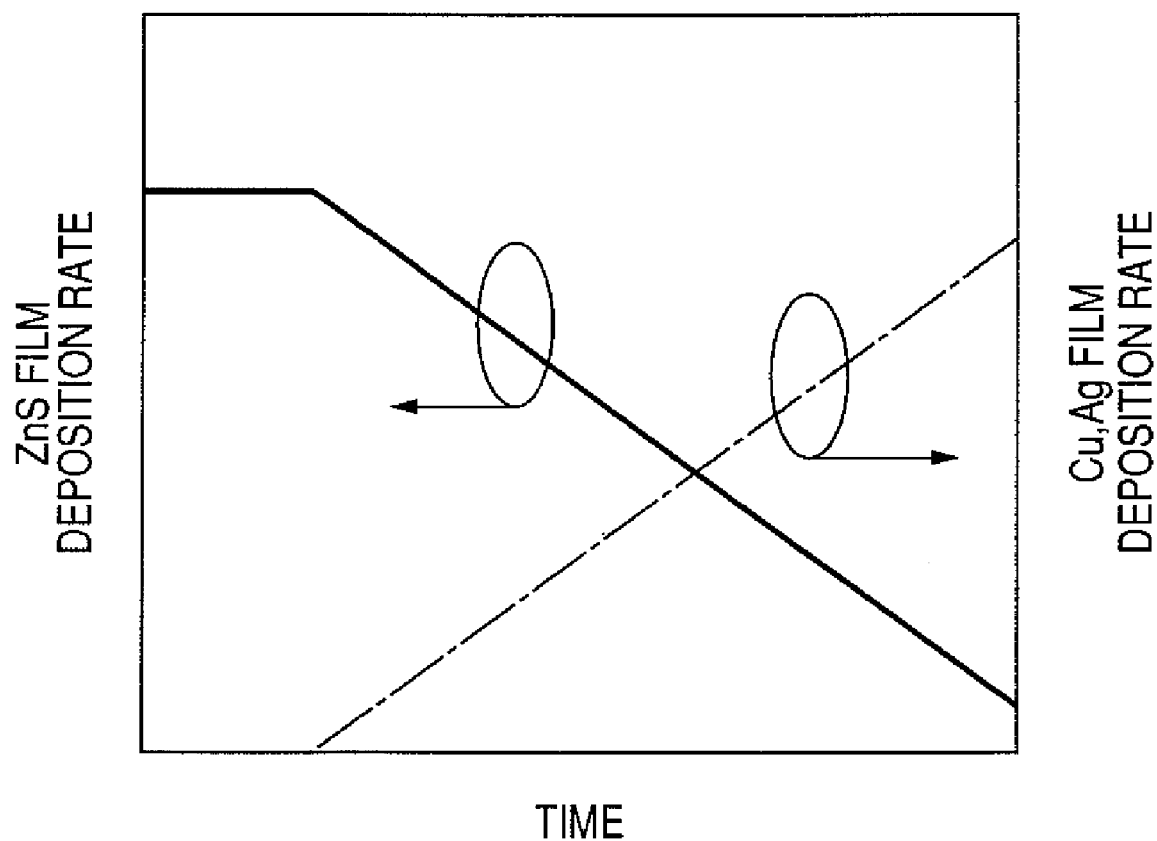
FIG. 7 is a graph showing the film deposition rate of a constituent element of the light emitting device as the embodiment of the present invention.

At this time, the substrate temperature was set to 600° C., and a mixed gas of $H_2S$ is flowed so as to have a pressure of about 0.01 Pa. In addition, at this time, the following adjustment is performed: the film deposition rate of Cu and ZnS is changed as shown in FIG. 7 by controlling the number of laser shots so that the Zn concentration ratio would increase toward the cathode 22.

The resultant layers are evaluated by X-ray diffraction. As a result, a peak resulting from the wurtzite structure of ZnS and a peak resulting from the chalcocite structure of $Cu_2S$ are observed.

In addition, the formation of the light emitting layer 23 and the fine structure layer 24 formed by the dispersed distribution of the matrix portion 27 and portions 28 is observed with an electron microscope.

In addition, the cross section parallel to the substrate of each of the portions 28 has an area of about several tens of square nanometers to several hundreds of square nanometers near the light emitting layer 23, and has an area of about several tens of square micrometers to several hundreds of square micrometers on the surface of the fine structure layer 24.

Next, Mo is formed into a film having a thickness of 10 nm and Pt is formed into a film having a thickness of 50 nm on the fine structure layer 24 by a magnetron sputtering method to provide an anode 26.

The device thus produced was evaluated for current-voltage characteristics by flowing a current in the device. As a result, the device was observed emitting rather bluish green light.

This is probably because material diffusion from the fine structure layer and the cathode takes place at the time of the formation of the light emitting layer 23 and the fine structure layer 24, whereby a portion formed of ZnS:Cu,Al was formed in the light emitting layer 23.

In addition, in this example, an interface between the light emitting layer 23 and the fine structure layer 24 in which the portions 28 each have a pointed shape is formed. Accordingly, it is conceivable that charge can be effectively injected by utilizing local electric field concentration. That is, it is conceivable that a light emitting device having high brightness can be obtained owing to such structure.

The occurrence of the local concentration of an electric field is conventionally apt to cause a device failure. In the present invention, however, a device failure hardly occurs probably because the crystallinity of the light emitting layer 23 and the crystallinity of each of the portions 28 are good, and the radius of curvature of the pointed portion of the portions 28 facing the light emitting layer 23 is controlled.

Example 4

An embodiment of the light emitting material in the present invention will be described with reference to FIG. 6.

A sapphire substrate is used as the substrate 21. ZnO:Al is formed into a film having a thickness of 150 nm to serve as the cathode 22 on the substrate 21 by a magnetron sputtering method using ZnO and Al as targets.

At this time, the substrate temperature is set to 300° C., and a mixed gas of Ar and $O_2$ is flowed so as to have a pressure of about 0.5 Pa. After that, the light emitting layer 23 and the fine structure layer 24 are formed as described below.

After a ZnS layer having a thickness of about 500 nm is formed by using a ZnS target, a layer formed of $Cu_2S$ and ZnS and having a thickness of 700 nm is formed by using ZnS and Cu as targets.

At this time, the substrate temperature is set to 300° C., and a mixed gas of Ar and $H_2S$ is flowed so as to have a pressure of about 0.5 Pa.

In addition, at this time, the following adjustment is performed: the film deposition rate of each of Cu and ZnS is changed as shown in FIG. 7 by controlling the power applied to each of the ZnS and Cu targets so that the Zn concentration ratio would increase toward the cathode 22.

Next, the substrate on which the layers are formed is subjected to a heat treatment by using an electric furnace under an Ar atmosphere containing 3% of $H_2Se$ at about 600° C.

The resultant layers are evaluated by X-ray diffraction. As a result, a peak resulting from the sphalerite structure of ZnS and a peak resulting from the chalcocite structure of $Cu_2S$ are observed.

In addition, the formation of the light emitting layer 23 formed of ZnS and the fine structure layer 24 formed by the dispersed distribution of the matrix portion 27 formed of ZnS and the portions 28 formed of $Cu_2S$ is observed with an electron microscope.

In addition, the cross section parallel to the substrate of each of the portions 28 has an area of about several hundreds of square nanometers near the light emitting layer 23, and has an area of about several tens of square micrometers to several hundreds of square micrometers near the surface of the fine structure layer 24.

Next, Mo is formed into a film having a thickness of 10 nm and Pt is formed into a film having a thickness of 50 nm on the fine structure layer 24 by a magnetron sputtering method to provide the anode 26.

The device thus produced was evaluated for current-voltage characteristics by flowing a current in the device. As a result, the device was observed emitting rather bluish green light.

This is probably because material diffusion from the fine structure layer and the cathode occurred at the time of the heat treatment, whereby a portion formed of ZnS:Cu,Al was formed in the light emitting layer 23.

The occurrence of the local conversion of an electric field is conventionally apt to cause a device failure. In this example, however, a device failure hardly occurs because the crystallinity of the light emitting layer 23 and the crystallinity of each of the portions 28 are good, and the radius of curvature of the pointed portion of the portions 28 facing the light emitting layer 23 is controlled.

Example 5

An embodiment of the light emitting material in the present invention will be described with reference to FIG. 2.

A sapphire substrate is used as the substrate 11. ZnO:Al is formed into a film having a thickness of 150 nm to serve as the cathode 12 on the substrate 11 by a magnetron sputtering method using ZnO and Al as targets.

At this time, the substrate temperature is set to 300° C., and a mixed gas of Ar and $O_2$ is flowed so as to have a pressure of about 0.5 Pa. After that, the light emitting layer 13 and the fine structure layer 14 are formed as described below.

A magnetron sputtering device provided with three cathodes was used for film formation.

After a ZnS layer having a thickness of about 500 nm is formed by using a ZnS target, a layer formed of $CuAlS_2$ and ZnS and having a thickness of 700 nm is formed by using ZnS, Cu, and Al as targets.

At this time, the substrate temperature is set to 300° C., and a mixed gas of Ar and $H_2S$ is flowed so as to have a pressure of about 0.5 Pa.

In addition, at this time, the following adjustment is performed: the film deposition rate of each of Cu and Al, and the film deposition rate of ZnS are changed as shown in FIG. 5 by controlling the power applied to each of the ZnS, Cu, and Al targets to provide the cathode 12.

Next, the substrate on which the layers are formed is subjected to a heat treatment by using an electric furnace under an Ar atmosphere containing 3% of $H_2S$ at about 600° C.

The resultant layers are evaluated by X-ray diffraction. As a result, a peak resulting from the sphalerite structure of ZnS and a peak resulting from the chalcopyrite structure of $CuAlS_2$ are observed.

The light emitting layer 13 formed of ZnS, the fine structure layer 14 formed by the dispersed distribution of the matrix portion 17 formed of ZnS and the portions 18 formed of $CuAlS_2$, and the p-type semiconductor layer 15 formed of $CuAlS_2$ are formed.

In addition, the cross section parallel to the substrate of each of the portions 18 has an area of about several square nanometers to several tens of square nanometers near the light emitting layer 13, and has an area of about several square micrometers to several tens of square micrometers near the p-type semiconductor layer 15.

Next, ITO is formed into a film having a thickness of 100 nm to serve as the anode 16 on the p-type semiconductor layer 15 by a magnetron sputtering method using ITO as a target at an Ar partial pressure of 0.5 Pa.

The device thus produced was evaluated for current-voltage characteristics by flowing a current in the device. As a result, the device was observed emitting rather bluish green light.

In this example, light can be extracted from the anode side as well because ITO is transparent.

In this case, light generated in the light emitting layer 13 passes the fine structure layer 14 as shown in FIG. 2. Accordingly, the following effect can be obtained: the ratio of total reflection of light on the interface reduces, and light extraction efficiency improves.

Example 6

Next, an example of the application of the light emitting device of the present invention as an image display device will be described.

The light emitting device of the present invention can be used as an image display device by driving the device by linearly arranging electrodes in a vertical matrix fashion.

A color image can be obtained by coloring white light emitted from a white light emitting material with an RGB filter or by subjecting light emitting materials corresponding to R, G, and B colors to patterning film formation with high accuracy.

Alternatively, the blue color of light emitted from a blue light emitting material can be converted into a green or red color by using a phosphor.

In addition, when the light emitting device of the present invention is used in an illuminator, a method involving the use of a white light emitting material, a method involving laminating R, G, and B light emitting materials in a longitudinal direction, or a method involving emitting blue or ultraviolet light and converting it into light having an R, G, or B color can be employed.

In addition, the light emitting devices of the present invention can be used in a printer such as a printing device by driving the light emitting devices arranged in a linear fashion instead of performing scanning with laser light by using a polygon mirror.

The light emitting device of the present invention can be utilized in an image display device, an illuminator, or a printing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-076840, filed Mar. 20, 2006, which is hereby incorporated by reference herein in its entirety.

What is claimed is:

1. A light emitting device, comprising:
a substrate; and
a first layer and a second layer laminated on the substrate, wherein:
the second layer is formed of:
a first portion containing Zn and at least one element chosen from S and Se as its constituent elements; and
a second portion containing at least one element chosen from Cu and Ag and at least one element chosen from S and Se as its constituent elements;
the first layer is a light emitting layer formed of Zn and at least one element chosen from S and Se and further contains at least one element chosen from Cu and Ag and at least one element selected from Al, Ga, and In; and in the second layer, the second portion has a cross section parallel to the substrate which tapers toward the first layer.

2. A light emitting device according to claim 1, wherein the second portion further contains at least one element selected from Al, Ga, and In.

3. A light emitting device according to claim 1, wherein the second portion has a crystalline structure of a chalcopyrite structure.

4. A light emitting device according to claim 1, wherein the light emitting device is structured so that light generated from the first layer is extracted to an outside of the light emitting device from the second layer.

5. A light emitting device according to claim 1, wherein a layer formed of a p-type semiconductor is provided to be adjacent to the second layer.

6. A light emitting device, comprising:
a substrate; and
a first layer and a second layer laminated on the substrate, wherein:
the second layer is formed of:
a first portion containing Zn and S as its constituent elements; and
a second portion containing Al, Cu, and S as its constituent elements;
the first layer is a light emitting layer formed of Zn and S as its constituent elements; and Al and Cu are added to the first layer; and
in the second layer, the second portion has a cross section parallel to the substrate which tapers toward the first layer.

7. A light emitting device, comprising:
a substrate; and
a first layer and a second layer laminated on the substrate, wherein:
the second layer is formed of:
a first portion containing Zn and S as its constituent elements; and
a second portion containing Cu and S as its constituent elements;
the first layer is a light emitting layer formed of Zn and S as its constituent elements; and Al and Cu are added to the first layer; and
in the second layer, the second portion has a cross section parallel to the substrate which tapers toward the first layer.

* * * * *